ELECTRICAL CIRCUITS FOR COMMUNICATION NETWORKS

Filed July 24, 1957

INVENTOR
R. E. LUNNEY
BY
ATTORNEY

United States Patent Office 2,972,683

Patented Feb. 21, 1961

2,972,683

ELECTRICAL CIRCUITS FOR COMMUNICATION NETWORKS

Raymond E. Lunney, East Orange, N.J., assignor to Bell Telephone Laboratories, Incorporated, New York, N.Y., a corporation of New York Filed July 24, 1957, Ser. No. 673,861

12 Claims. (Cl. 307—88.5)

Figure 1:
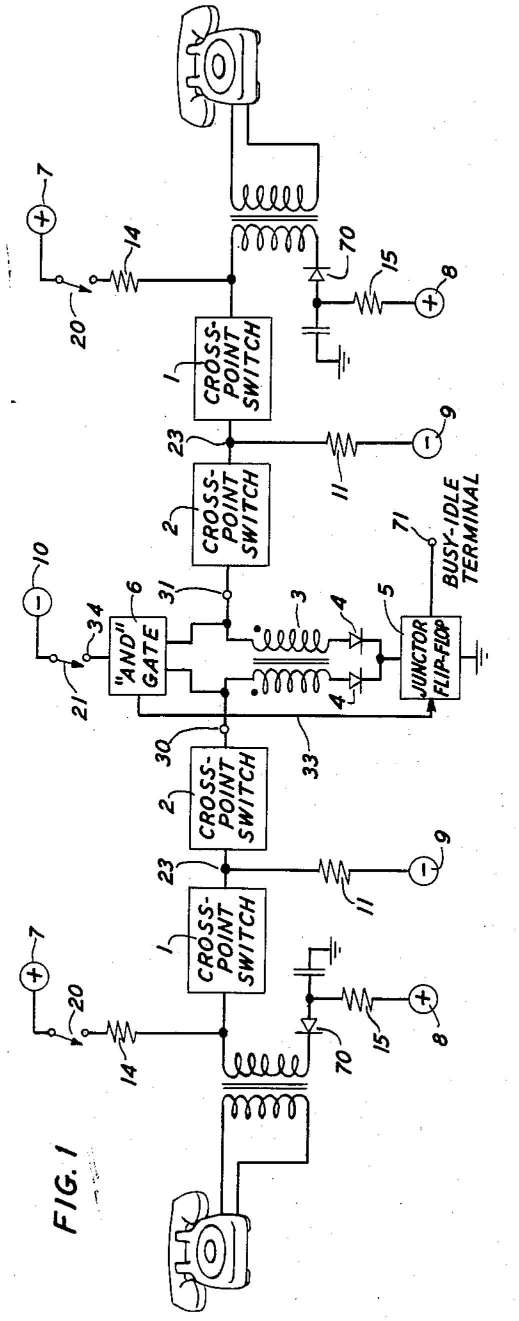

This invention relates to electrical circuits and more specifically to circuits for the establishment and control of a path through a communication network.

In switching control networks for communication circuits, such as in telephone central office switching networks for example, the required function is the establishment and control of communication paths between pairs of a large number of spatially separated subscribers, and various systems have been devised to perform this function. One such system is disclosed in Patent 2,686,837 of S. T. Brewer and E. Bruce, issued August 17, 1954. This system follows the method of marking several alternate paths between the points to be connected and then selecting one of these paths by a second marking condition at an intermediate point.

The communication paths of a system of this kind are composed of a number of crosspoint devices interconnected in series-parallel combination in a fan-out configuration. Various devices suitable for use in such crosspoints are known in the art. The gas diode is one such device and a system utilizing gas diodes for crosspoints in a communication network is disclosed in Patent 2,684,405 issued July 20, 1954 to E. Bruce and H. M. Straube. Another switching system in which transistors are employed as the crosspoint devices is disclosed in a copending application Serial No. 334,552, now Patent No. 2,876,285, filed February 2, 1953 by B. G. Bjornson and E. Bruce.

It is common for systems of the type referred to previously to separate the crosspoint switching network at some intermediate point by a control circuit which will be herein designated a junctor, although it has also been referred to as a bisector, or mactor circuit. Utilization of a junctor intermediate in a crosspoint switching network introduces a number of advantages. The margin requirements imposed on the associated crosspoint circuitry are thereby rendered less stringent and the fan-out network of interconnected crosspoints is less complex with a corresponding reduction in required equipment. Furthermore, junctors facilitate the control function in the switching of the communication paths through the crosspoint network. In copending application Serial No. 617,131, now Patent No. 2,883,470, filed October 19, 1956 by G. E. Jacoby and J. W. Rieke, a communication network employing gas tubes as crosspoints and junctors is disclosed in which the junctors function both to establish and to disestablish the paths through the network.

An object of my invention is the provision of an improved junctor circuit for a comunication network.

A further object of my invention is the provision of a junctor circuit capable of functioning with simplified control circuitry.

It is another object of my invention to provide an improved bistable circuit.

Crosspoint switching networks of the type just described commonly have a pair of symmetrical circuit configurations on either side of a junctor circuit. Previously, it has been found necessary to apply a marking signal to the central junctor circuit as well as to the external marking terminals to cause the disestablishment of an existing connection. In one specific embodiment of my invention, I provide a coincident signal circuit to control a junctor flip-flop. The flip-flop of this specific embodiment makes use of a pair of transistors normally maintained in a non-conducting condition. Upon the simultaneous application of the proper signals the flip-flop is switched to its ON condition, which provides a low impedance to ground from both network terminals of the junctor thereby establishing and maintaining a communication path through the network until a marking signal is applied at either one of the communication network terminals to request the disestablishment of the communication path. By means of a feedback circuit in the junctor flip-flop, the flip-flop is thereby returned to its high impedance state which in turn disestablishes the path through the network. The feedback function is performed by a resistor in the emitter branch of the output transistor of the junctor flip-flop which, when the marking voltage drives a current above some critical value through this output resistor, causes both transistors to return to their non-conducting state.

My invention permits the flip-flop to be turned off by the same kind of external marking signals that is applied to initiate the connection. This permits considerable simplification of the control circuitry used in conjunction with the switching network and eliminates the need for some of the memory formerly provided in previous junctor circuitry.

It is a feature of this invention that a logic circuit in conjunction with a flip-flop circuit accomplish the switching of the flip-flop circuit to its low impedance state upon the simultaneous application of proper marking signals at the logic circuit input terminals, thereby completing a communication path through an associated switching network.

It is another feature of this invention that a junctor circuit for use with a transistor communication network be so arranged that the junctor path may be switched to its high impedance state upon the application of one of the same signals which is used to establish a communication path initially.

An additional feature of my invention comprises a pair of transistors, normally maintained in a non-conducting state, so connected that one transistor, when turned on, turns on the second transistor which is further connected to turn off the first transistor which in turn switches off the second transistor.

It is a further feature of this invention that a transistorized flip-flop be switched from its ON to its OFF condition by the application of a signal at its output terminal.

It is also a feature of my invention that an alternating current transmission path be provided between a pair of terminals, in which path the conduction of alternating current is dependent upon the impedance to ground through an associated transistor which is in turn controlled by another transistor arranged with the first transistor in a bistable electrical circuit.

Figure 2:
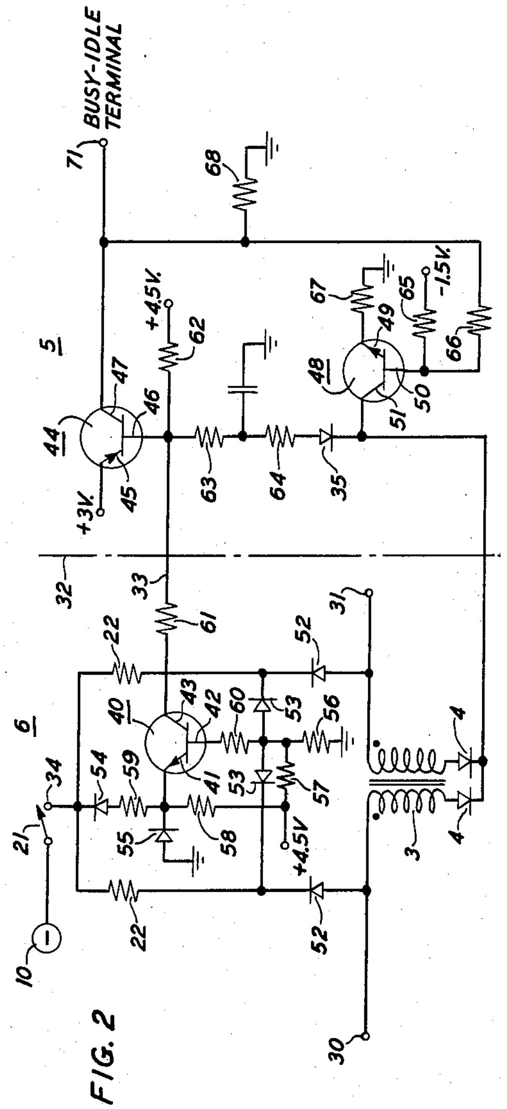

These and other features of this invention may be better understood by a more detailed description of the drawing in which:

Fig. 1 is a schematic representation of a communication network including one specific embodiment of this invention; and Fig. 2 is a more detailed schematic representation of the portion of the circuit of Fig. 1 appearing between terminals 30 and 31.

Fig. 1 depicts a skeleton circuit representing a communication network connected between a pair of telephone stations. The circuit comprises a pair of symmetrical sections on either side of terminals 30 and 31. Each section includes outer crosspoint device 1 and inner crosspoint device 2 together with associated circuitry to provide for breaking down the crosspoints upon the application of proper control signals. Between terminals 30 and 31 is the junctor circuit which includes an AND gate 6, a junctor flip-flop 5, a transformer 3 and a pair of isolation diodes 4. The presence or absence of a communication path between the two telephone stations depends upon the state of conduction of the crosspoints 1 and 2 and the junctor flip-flop 5. Positive potential sources 8 provide holding voltages for the network which are sufficient in this circuit to maintain the crosspoints 1 and 2 in their low impedance state so long as the junctor flip-flop 5 is turned on and the crosspoints 1 and 2 have been broken down. Negative potential sources 9 serve to assist in the breakdown of crosspoint switches 1 upon the application of a sufficiently high positive voltage at the outside terminal of these crosspoint switches. This high voltage is supplied from positive potential source 7 which is of greater magnitude than potential source 8 and which furnishes a marking voltage through switch 20 and resistor 14 to initiate the establishment of a communication path through the network. Negative potential source 10 furnishes a negative marking potential through switch 21 to terminal 34 of the particular junctor which is to be used in establishing and maintaining the communication path.

Establishment of the communication path through the network proceeds as follows:

Marking potentials 7 are applied through switches 20 and resistors 14 to the external terminals at both ends of the crosspoint network. Working with negative sources 9 through resistors 11, the external marking signals break down crosspoint switches 1. Positive potentials are then established at point 23 between the crosspoint switches 1 and 2 which, acting with negative potential 10 applied to terminal 34 by the closure of switch 21, break down inner crosspoints 2 and drive terminals 30 and 31 positive to furnish two of the inputs to the AND gate 6. The negative marking signal at terminal 34 furnishes the other input to AND gate 6. With positive signals at terminals 30 and 31 and the negative potential at terminal 34, the AND gate provides a negative output on lead 33 to turn on junctor flip-flop 5 which then provides a low impedance path through itself to ground. With a low impedance path established from terminals 30 and 31 to ground, current can flow through the windings of transformer 3, thereby providing alternating current transmission through transformer 3 and permitting the communication path to be maintained by a lower holding voltage. Upon the simultaneous removal of all marking voltages by the opening of switches 20 and 21, the communication path is maintained and the crosspoint switches are held in their conducting state by holding voltages 8 applied through resistors 15 and diodes 70.

Disestablishment of an existing communication path through the network may be accomplished by the application of either one or both of the external marking potentials 7 at the end terminals of the network through switches 20 and resistors 14. In a manner which will be explained with reference to Fig. 2, application of either of these potentials 7 in the absence of the application of negative marking potential 10 causes the junctor flip-flop 5 to switch to its high impedance state, thereby opening the path through crosspoints 2. Then, upon the removal of marking potentials 7, crosspoint switches 1 return to their non-conducting state and the communication path is completely disestablished.

It should be here noted that the circuit depicted in Fig. 1 represents but a single one of the many alternate paths available in a crosspoint switching network. In any operational network, as in those of the patent and applications hereinbefore cited, multiple connections to alternate crosspoints or junctors exist at each common point between crosspoints or between crosspoints and junctors. In the interest of clarity and simplicity these multiple connections are omitted from the diagram of Fig. 1.

Fig. 2 is a more detailed schematic representation of one specific embodiment of my invention which was shown in simplified form between terminals 30 and 31 in Fig. 1. In Fig. 2, terminals 30 and 31 correspond to the same terminals in Fig. 1. Transformer 3 and diodes 4 correspond to their counterparts in Figs. 1. The portion of Figs. 2 to the left of the vertical dash line 32, excluding transformer 3 and diodes 4, comprises the AND gate 6 of Fig. 1. The portion of Fig. 2 to the right of the dash line 32 corresponds to the junctor flip-flop 5 of Fig. 1. Transistor 40, having emitter 41, base 42 and collector 43, serves as the AND gate amplifier and is normally biased off by the +4½ volt potential source and resistors 56, 57, 58 and 60. The application of positive potentials to both of terminals 30 and 31 forward biases diodes 52 but finds diodes 53 and 54 in a reverse biased condition so no change in the state of conduction of transistor 40 occurs. However, if, while both terminals 30 and 31 are positive, the switch 21 is closed to provide a negative potential from source 10 to terminal 34, the emitter 41 of transistor 40 becomes clamped at ground potential by diode 55 and the current through resistor 59 and diode 54 to negative source 10. Since the base is maintained at some positive potential between ground and +4½ volts, as determined by resistors 56 and 57, transistor 40 now conducts and a negative output is delivered through resistor 61 along lead 33 to the base 46 of transistor 44 in the junctor flip-flop.

Transistor 44, having emitter 45, base 46 and collector 47, is normally biased off by a positive potential from the +4½ volt source delivered through resistor 62. Transistor 44 furthermore controls the state of conduction of transistor 48 which is also normally biased off by the application of a negative potential from the −1½ volt source through resistor 65 to the base 50. With the appearance of a negative signal from transistor 40 upon lead 33, transistor 44 is turned on and its collector 47 is switched near the potential of its emitter 45 which is +3 volts. This turns on transistor 48 through resistor 66, and transistor 48 then provides a low impedance path between its collector 51 and its emitter 49. Since resistor 67 has a comparatively low value of resistance, this means that a low impedance path is provided from terminals 30 and 31 through the now forward biased diodes 4, the transistor 48 and resistor 67 to ground. As explained before, this permits the crosspoints 1 and 2 to be maintained in their low impedance states and establishes the communication path through the entire network.

Resistor 67, being connected in the emitter circuit of transistor 48, provides a certain amount of degenerative feedback to that transistor. The resistance of resistor 67 is determined, in conjunction with the resistance in the rest of the crosspoint network and the selection of the holding potentials 8 and the positive marking potentials 7, so that transistor 48 is maintained in its low impedance condition so long as the crosspoint switches 1 and 2 are held on by the holding potentials 8 but will be switched to its high impedance state upon the closure of either of switches 20. The current from the 4½ volt bias source for transistor 44 flows through resistors 62, 63 and 64 and the diode 35 and thence through transistor 48 and the resistor 67. If the current through resistor 67 exceeds a certain critical value the base 46 of transistor 44 is driven sufficiently positive to turn off transistor 44, which then turns off transistor 48, and the junctor flip-flop is returned to its state of high impedance. As previously described, this opens the crosspoints 2 of Fig. 1 to initiate disestablishment of the communication path through the network.

As far as the flip-flop circuit is concerned, the collector 51 of transistor 48 is the output terminal of this circuit.

This means that once the flip-flop is turned on, it is under the control of the current which is applied to its output terminal. So long as this current remains below some critical value, the flip-flop remains on. When this output current exceeds some particular value, the feedback provided by resistor 67 causes the flip-flop to be turned off. Thus, with control of the junctor possible from collector 51 of transistor 48 and from there through either or both of terminals 30 and 31, it can be seen how it is possible to achieve disestablishment of an existing communication path from the external terminals of the network alone without the need for additional memory circuits to keep track of which particular junctor is involved in any given communication path or for the provision of special signals to be supplied directly to the junctor circuit itself.

If dseired the busy or idle state of the junctor circuit can be detected at a Busy-Idle terminal 71 connected to the collector 47 of transistor 44 and to resistor 68, the other side of which is grounded.

The values of voltage shown were those used to provide the proper operation of the depicted specific embodiment of my invention. It should be understood that my invention is not limited to the application of any particular voltage source or biasing arrangements.

While switches 20 and 21 are depicted in the drawing as being manually operated switches, it should be emphasized that electronic switches could readily be employed in place of those shown.

It is to be understood that the above-described circuits are merely illustrative of the application of the principles of the invention. Numerous other arrangements may be devised by those skilled in the art without departing from the spirit and scope of the invention.

What is claimed is:

1. An electrical circuit comprising a conductor and switching means for electrically connecting said conductor to a high or low impedance, said switching means comprising first and second transistors each having a base, an emitter and a collector electrode, means connecting said conductor to said first transistor collector, means biasing said first transistor to present a high impedance to said conductor, means for turning on said first transistor to present a low impedance to said conductor comprising means connecting said second transistor collector to said first transistor base, a gate circuit connected to said second transistor base, means connecting said conductor to said gate, means for enabling said gate to turn on said second transistor upon concurrent appearance of a control signal and a distinct signal on said conductor at respective input terminals of said gate, and means comprising impedance means connected to said first transistor emitter and between said first transistor collector and second transistor base for turning off said first and second transistors in response to said distinct signal on said conductor in the absence of said control signal.

2. A circuit for selectively switching between a high impedance and a low impedance connection to a line in response to a distinct signal on the line comprising a pair of transistors each having collector, emitter and base electrodes, a transmission line, a gate, means for applying a distinct signal on said line to one input of said gate and to the collector of one of said transistors, means for applying the output of said gate resulting from coincident application to said gate of said distinct signal and a control signal to the base of the other transistor, means cross-connecting the base and collector electrodes of said transistors, and means including said cross-connecting means for activating said one transsitor to provide a low impedance path through its emitter-collector circuit, said distinct signal on said transmission line serving to turn off said one transistor in the absence of an output signal from said gate so as to provide a high impedance path through the emitter-collector circuit of said one transistor.

3. An electrical circuit comprising a pair of conductors, a control lead, switching means for establishing an electrical coupling between said conductors upon the concurrence of distinct signals on said conductors and control lead, said switching means comprising a pair of transistors having input, output and control electrodes, one of said transistors having its output electrode connected to said pair of conductors, means for activating said one transistor to establish a low impedance path between said pair of conductors and ground comprising means connecting the output electrode of the other transistor to the control electrode of said one transistor, a coincidence logic circuit having input terminals connected to said pair of conductors and said control lead, means for applying the output of said logic circuit upon coincident receipt of signals at all of its input terminals to said other transistor control electrode, and means comprising feedback means connected to said one transistor input electrode for decoupling said pair of conductors upon the appearance of said distinct signal on at least one of said conductors in the absence of said concurrence of distinct signals on said conductors and control lead.

4. An electrical circuit comprising a conductor and means for selectively switching between high and low impedance conditions in said conductor in the presence of a distinct signal on said conductor comprising a first transistor having an emitter, a collector and a base, means connecting said first transistor collector to said conductor, first impedance means connecting said first transistor emitter to a reference potential source, means for biasing said first transistor to be normally non-conducting so as to define a high impedance between said conductor and said reference potential, means for causing said first transistor to conduct and thereby to define a low impedance between said conductor and said reference potential comprising a second normally non-conducting transistor having its collector connected to said first transistor base, triggering means connected to the base of said second transistor for causing said second transistor to conduct, means for activating said triggering means comprising means connected to said conductor for applying a current signal to said triggering means, and means comprising said first impedance means for restoring said first transistor to its high impedance non-conducting condition upon receipt of said current signal on said conductor at said first transistor collector when said triggering means is inactive.

5. An electrical circuit in accordance with claim 4 wherein said restoring means comprises second impedance means and a diode connected between said first transistor collector and said second transistor base, said diode being poled so as to allow conduction only toward said first transistor collector.

6. An electrical circuit in accordance with claim 5 and further comprising means for applying a control signal to said triggering means, said triggering means providing an output signal to activate said second transistor only upon coincident receipt of said control signal and said current signal by said triggering means.

7. A bistable electrical circuit comprising a pair of transistors each having an emitter, a base and a collector, first connecting means from the collector of the first transistor to the base of the second transistor, second connecting means from the collector of said second transistor to the base of said first transistor, a first resistor connected to the base of said first transistor, means applying potential of one polarity to said first resistor, a second resistor connected to the base of said second transistor, means applying a potential of the opposite polarity to said second resistor, means comprising a gate circuit receiving a current pulse as one input for applying a first input signal to the base of said second transistor to cause conduction in said second transistor and through said second connecting means to cause conduction in said first transistor, and means for applying said current pulse to the collector of said first transistor to turn off said second transistor and, through said second connecting means, to turn off said first transistor in the absence of said first input signal.

8. A bistable electrical circuit in accordance with claim 7 wherein said first connecting means includes a diode poled so as to be conducting when said first and said second transistors are conducting.

9. A bistable electrical circuit in accordance with claim 8 further comprising impedance means connected from ground to the emitter of said first transistor, current flow through said first transistor and said impedance to ground on occurrence of said current pulse at said collector preventing conduction through said diode.

10. A bistable electrical circuit in accordance with claim 9 and further comprising means for applying a control pulse to said gate circuit, the coincidence of a control pulse and a current pulse at said gate circuit inputs producing said first input signal at the output of said gate circuit.

11. An electrical circuit comprising first, second and third transistors, each of said transistors having input, output and control electrodes, means for turning on said third transistor upon the coincident application of first and second signals to said third transistor input electrode, means for applying said first signal to said first transistor output electrode, means cross-connecting the control and output electrodes of said first and second transistors, means for applying the output of said third transistor to said second transistor control electrode to turn on said second and first transistors in turn, and feedback means connected between ground and said first transistor input electrode for turning off said second and first transistors in turn upon the application of said first signal to said circuit with said third transistor turned off.

12. A bistable electrical circuit comprising first and second transistors of opposite conductivity types each having base, emitter and collector electrodes, connecting means between the base of said first transistor and the collector of said second transistor, biasing means connected to said transistors to maintain each transistor normally non-conducting, load means connected to the collector of said first transistor, control means connected between said load means and said second transistor base for causing said second transistor and, through said connecting means, said first transistor to become conducting upon coincident application to said control means of a control signal and a distinct signal from said load means, and feedback means connected to the emitter of said first transistor for causing said second transistor and, through said connecting means, said first transistor to become non-conducting upon the presence in said load means of said distinct signal with said control means inactive.

References Cited in the file of this patent

UNITED STATES PATENTS

| | | |
|---|---|---|
| 2,705,743 | Klinkhammer | Apr. 5, 1955 |
| 2,724,061 | Emery | Nov. 15, 1955 |
| 2,724,780 | Harris | Nov. 22, 1955 |
| 2,770,732 | Chong | Nov. 13, 1956 |
| 2,778,879 | Buchner | Jan. 22, 1957 |
| 2,885,573 | Clapper | May 5, 1959 |